(12) United States Patent
Fedgenhaeuer et al.

(10) Patent No.: US 10,281,314 B2
(45) Date of Patent: May 7, 2019

(54) DEVICE FOR MEASURING A FILL LEVEL OF A LIQUID

(71) Applicant: Hella KGaA Hueck & Co., Lippstadt (DE)

(72) Inventors: Silvio Fedgenhaeuer, Bremen (DE); Sergej Tonewizki, Diepholz (DE); Ingo Zoyke, Stuhr-Moordeich (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 95 days.

(21) Appl. No.: 15/463,753

(22) Filed: Mar. 20, 2017

(65) Prior Publication Data

US 2017/0284851 A1  Oct. 5, 2017

(30) Foreign Application Priority Data

Mar. 30, 2016 (DE) .................. 10 2016 003 657
Sep. 27, 2016 (DE) .................. 20 2016 105 373 U

(51) Int. Cl.
*F01M 11/06* (2006.01)
*F01M 11/12* (2006.01)
(Continued)

(52) U.S. Cl.
CPC ......... *G01F 23/2961* (2013.01); *F01M 11/12* (2013.01); *G01F 23/0061* (2013.01); *G01F 23/296* (2013.01); *F01M 11/06* (2013.01)

(58) Field of Classification Search
CPC .................................................. G01F 23/296
See application file for complete search history.

(56) References Cited

U.S. PATENT DOCUMENTS 4,817,531 A * 4/1989 Walker .............. E21B 43/117
                                                  102/306
6,272,921 B1 * 8/2001 Ivanovich ........... G01F 23/2966
                                                  73/290 V
(Continued)

FOREIGN PATENT DOCUMENTS

CN      201748957 U    2/2011
DE      197 03 206 A1  7/1998
(Continued)

OTHER PUBLICATIONS

Search Report issued in corresponding German patent application No. 102016003658.3 (20 pages).
(Continued)

*Primary Examiner* — Paul M. West
(74) *Attorney, Agent, or Firm* — Muncy, Geissler, Olds & Lowe, P.C.

(57) ABSTRACT

In a device for measuring a fill level of a liquid in a reservoir with an ultrasonic sensor, wherein the ultrasonic sensor is arranged at the bottom end of a damping cup with a measuring tube, wherein electronic components are assigned to the ultrasonic sensor, the electronic components are encapsulated in sealing manner against the liquid that is to be measured between a floor of an electronics installation space and a cover arranged above the floor, so that the electronics installation space forms and encapsulated area. At least one support is provided inside the electronics installation space and connects the cover in force-fitting manner with the electronics installation space.

12 Claims, 3 Drawing Sheets

(51) Int. Cl.
*G01F 23/00* (2006.01)
*G01F 23/296* (2006.01)

(56) References Cited

U.S. PATENT DOCUMENTS

| | | |
|---|---|---|
| 6,393,922 B1 | 5/2002 | Winterer |
| 6,629,457 B1 | 10/2003 | Keller |
| 7,954,384 B2 | 6/2011 | Koehler et al. |
| 8,191,423 B2 | 6/2012 | Chiou et al. |
| 8,276,445 B2 | 10/2012 | Reiche |
| 8,555,716 B2 | 10/2013 | Niemann et al. |
| 8,596,139 B2 | 12/2013 | Mueller et al. |
| 9,006,847 B2 | 4/2015 | Welter et al. |
| 9,087,504 B2 | 7/2015 | Mueller et al. |
| 9,163,974 B1 | 10/2015 | Kekäläinen |
| 2009/0314575 A1 | 12/2009 | Reiche |
| 2010/0089169 A1 | 4/2010 | Koehler et al. |
| 2012/0174680 A1 | 7/2012 | Wade et al. |
| 2013/0221458 A1 | 8/2013 | Welter et al. |
| 2013/0270749 A1 | 10/2013 | Hachtmann et al. |
| 2014/0352426 A1 | 12/2014 | Kuehnel et al. |
| 2015/0090018 A1 | 4/2015 | Niemann et al. |
| 2015/0377684 A1 | 12/2015 | Strackerjan et al. |

FOREIGN PATENT DOCUMENTS

| | | |
|---|---|---|
| DE | 199 42 378 A1 | 3/2001 |
| DE | 100 57 397 A1 | 5/2002 |
| DE | 10 2005 006 753 A1 | 8/2006 |
| DE | 10 2005 043 263 A1 | 3/2007 |
| DE | 10 2006 040 344 A1 | 3/2008 |
| DE | 10 2006 059 741 A1 | 7/2008 |
| DE | 10 2007 014 539 A1 | 10/2008 |
| DE | 10 2007 014 540 A1 | 10/2008 |
| DE | 20 2008 011 684 U1 | 12/2008 |
| DE | 10 2008 017 183 A1 | 10/2009 |
| DE | 10 2008 055 126 A1 | 7/2010 |
| DE | 10 2009 036 888 A1 | 12/2010 |
| DE | 10 2009 046 148 A1 | 5/2011 |
| DE | 10 2010 011 490 A1 | 9/2011 |
| DE | 10 2010 039 599 A1 | 2/2012 |
| DE | 11 2011 101 128 T5 | 2/2013 |
| DE | 10 2012 200 757 A1 | 7/2013 |
| DE | 10 2012 002 011 A1 | 8/2013 |
| DE | 10 2012 004 932 A1 | 9/2013 |
| DE | 10 2012 014 307 A1 | 1/2014 |
| DE | 10 2013 016 164 A1 | 4/2015 |
| DE | 10 2014 009 543 A1 | 12/2015 |
| DE | 10 2014 009 610 A1 | 12/2015 |

OTHER PUBLICATIONS

Epoxy resin adhesives for high temperature applications, DELO Company, Mar. 18, 2015 https://www.delo.de/fileadmin/user_upload/documents/de/brochures/Epoxidharz-Klebstoffe_fuer_Hochtemperatur-Anwendungen_DE.pdf (last retrieved on Mar. 29, 2017).
Habenicht, Gerd, "Plastics and other non-metallic materials" Bonding: Basics, technologies,applications, 2009, pp. 645-737.
Habenicht, Gerd, "Constructive design of metal bonding" Bonding: Basics, technologies, applications, 2009, pp. 529-537.

* cited by examiner

DEVICE FOR MEASURING A FILL LEVEL OF A LIQUID

BACKGROUND OF THE INVENTION

Field of the Invention

The invention relates to a device with an ultrasonic sensor for measuring a fill level of a liquid in a reservoir, wherein the ultrasonic sensor is arranged at the bottom end of a damping cup with a measuring tube, wherein electronic components are assigned to the ultrasonic sensor.

Brief Description of the Related Art

A device of such kind is described for example in DE 10 2014 009 610 A1. Such devices are used in particular to measure the fill level of engine oil in an oil-lubricated engine, particularly in a motor vehicle. Ultrasonic sensors are used to determine the fill level of the liquid, that is to say particularly the oil level. Said sensors emit ultrasonic waves, which are reflected at the boundary surface between two media, in this case between air and oil, and are received again by the ultrasonic sensor. Then, the fill level in the reservoir in which the liquid is stored can be calculated from the time the ultrasonic waves take to return. In a running engine, in particular in a motor vehicle, however, the fill level of the oil is difficult to determine because the oil is heavily foamed, and the ultrasonic waves are reflected by the gas bubbles in the oil. Consequently, the detected values fluctuate substantially. In order to be able to take a measurement with usable values, an unambiguous boundary surface is needed between the gas-phase medium, in this case the air, and the oil. In order to do this, devices called damping cups are assigned to the ultrasonic sensors. The damping cups typically have an antechamber. Inside these damping cups, which surround the measuring section of the ultrasonic sensor, the liquid to be measured is calmed and only communicates with the reservoir through a small opening in the damping cup. Oil passes into the damping cup, particularly into the antechamber of the damping cup, through the small opening between the damping cup and the reservoir, and there it releases the gas it contains. From this antechamber, the oil then passes into the actual measuring tube. The fill level in the measuring tube is the same as the fill level in the reservoir, but it is damped with respect to fluctuations by the small opening in the damping cup. Fluctuations, which are caused for example by acceleration or cornering, are slowed and smoothed. In order to ensure the longest possible service life for the device, in a known embodiment the ultrasonic sensor with its connected electronic components is overmoulded with a thermosetting plastic. In order to be able to carry out the subsequent installation processes, the electronic connectors remain outside the overmoulding.

SUMMARY OF THE INVENTION

The object underlying the invention is to create a device of the kind described in the introduction, which is particularly hard wearing and durable. The solution to this object is presented in the form of a device having the features of patent claim 1. Advantageous variations are described in the subordinate claims.

In a device for measuring a fill level of a liquid in a reservoir with an ultrasonic sensor, wherein the ultrasonic sensor is arranged at the bottom end of a damping cup with a measuring tube, wherein electronic components are assigned to the ultrasonic sensor, and particularly connected thereto, it is provided as an essential feature of the invention that the electronic components between a floor of the electronics installation space and a cover arranged over the top thereof are separated in a sealing manner from the liquid to be measured by encapsulation, so that the electronics installation space forms an encapsulated area, and at least one support is provided inside the electronics installation space to attach the cover in force-fitting manner to the floor of the electronics installation space. With such a device, the loads on the sensor and in particular on the encapsulated area can be absorbed. Vibration in both the X-axis and the Y-axis give rise to very high loads for the device for measuring the fill level. These loads are also directly related to the length of the damping cup. The loads and movements of the damping cup are transmitted to the various components, such as the electronic system and the ultrasonic sensor. Further mechanical loads are coupled in via the encapsulated area and the indispensable connection between the upper cover and the floor of the electronics installation space. These are absorbed by the additional supports inside the electronics installation space. Any relative movement between the cover and the floor of the electronics installation space is reduced.

In a preferred variation of the invention, the longitudinal extension of the support is greater than the diameter of the measuring tube. This ensures that the support is able to absorb the vibrations introduced via the measuring tube over the full longitudinal extension thereof. For this purpose, the support is preferably constructed in the form of a strut and is also preferably at least as long as it is high. Preferably, two parallel supports are provided, which are also in the form of parallel struts. These struts are particularly preferably arranged symmetrically about the measuring tube and in particular on opposite sides of the measuring tube.

In a particularly preferred embodiment of the invention, the support is a closed geometrical structure. The closed geometrical structure is particularly preferably arranged such that it surrounds the axis of the measuring tube and is particularly preferably arranged symmetrically about the axis of the measuring tube. In a preferred embodiment, the closed geometrical structure may form a square. Alternatively, the closed geometrical structure may also be a circle, a rhombus or a rectangle.

In another preferred variation of the invention, the support is constructed as a single piece with the cover. This means that, particularly if the device is a plastic component, the supports are conformed integrally with the cover, usually in the form of elongated struts extending downwards from the cover. The supports are connected in force-fitting manner to the floor of the electronics installation space. This is preferably assured with a force-fitting bonded joint.

In order to create the encapsulated electronics installation space within the scope of the device according to the invention, the cover is connected to the floor of the electronics installation space via a sealing bonded joint in the outer edge area. For this purpose, the cover and the floor of the electronics installation space have corresponding geometrical shapes, so that the two parts lie flush and/or abut against each other in a peripheral edge area and share a contact surface that is wide enough to enable a bonded joint to be created there. In a preferred variation, the top of the cover has a cutaway in the area of the measuring tube, so that the ultrasonic sensor can be arranged in the area of this cutaway in the cover, and can transmit the ultrasonic waves into the measuring tube through said cutaway. In order to manufacture an encapsulated electronics installation space, the ultrasonic sensor must then be connected or fastened to this cutaway in sealing manner. This is preferably also realised with a sealing bonded joint. In principle, other bonding forms such as a sealing snap-lock connection are also conceivable. The device according to the invention with the force-transmitting struts arranged inside the electronics installation space particularly also protects the sealing connections of the cover and the floor of the electronics installation space, which must guarantee that the surrounding medium will not penetrate. The constant exposure of these areas to forces and vibrations via the damping cup and particularly via the measuring tube also poses a constant risk that the sealing joint will not be maintained for the long term. As the forces acting on the damping cup are transmitted via the supports, the load is removed from the other connections, which are designed to ensure that no leakage occurs. This helps to extend the service life of the device as a whole.

A further aspect of the invention consists in the provision of an internal combustion engine, particularly for motor vehicles, with an oil-lubricated engine, wherein the oil-lubricated engine includes a device as described above for measuring the fill level of the engine oil. The invention further relates to a motor vehicle equipped with such an internal combustion engine.

BRIEF DESCRIPTION OF THE DRAWINGS

In the following, the invention will be explained further with reference to an exemplary embodiment thereof represented in the drawing. The diagrams in the individual figures of the drawing show the following.

DETAILED DESCRIPTION OF THE PREFERRED EMBODIMENTS

Figure 1:
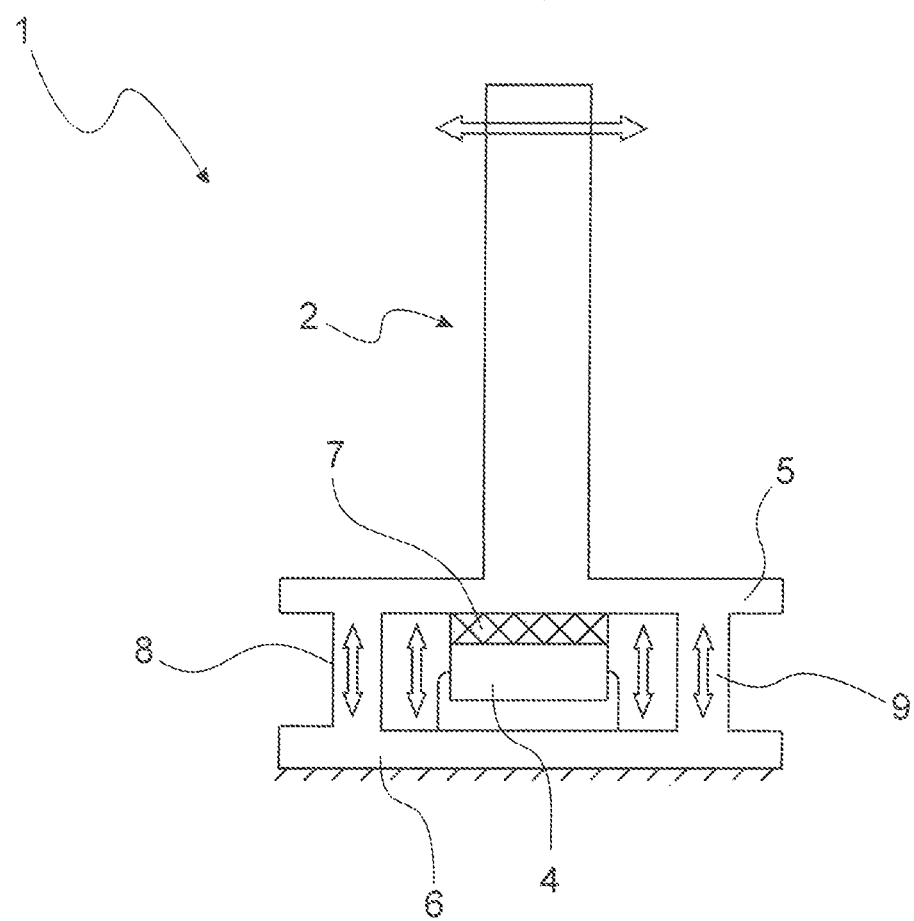
FIG. 1: a schematic representation of a device according to the invention.

FIG. 1 is a highly simplified schematic representation of device 1 with a damping cup 2. Though not shown individually here, measuring tube 3 is located in the middle of damping cup 2, and ultrasonic sensor 7, which transmits the ultrasonic waves into measuring tube 3 from below, is located at the foot of measuring tube 3. Ultrasonic sensor 7 is positioned underneath a cover 5 and above a floor 6 of an electronics installation space 4, in which electronic components and elements for controlling the ultrasonic sensor are arranged. Optionally, the space may also accommodate other components for signal processing and signal analysis. Electronics installation space 4 is encapsulated to keep it separate from the surrounding medium. For this purpose, sealing connections between cover 5 and floor 6 of electronics installation space 4 are provided in the external area, which is not shown here. In this context, it is essential for the purposes of the invention that supports 8 and 9 are provided and present inside the encapsulated electronics installation space 4 and serve to absorb both tensile and compressive forces as well as shearing forces. Vibrations that are generated exert very high loads on device 1, in particular on damping cup 2, and on the components of device 1 close to the floor. These forces increase with the height of installation of damping cup 2. The action of forces is indicated by a double-headed arrow. Supports 8 and 9 absorb the tensile and compressive forces. This is represented by the double-headed arrows. Supports 8 and 9 also absorb horizontal shearing forces. The effect of the invention and additionally provided supports 8 and 9 and box structure created thereby is to reduce the relative movement between cover 5 and floor 6 of electronics installation space 4 and to reduce the transmission of forces to the electronics. The overall effect thereof is to make it possible to increase the length of device 1, particularly the height of damping cup 2, without overloading the electronics.

Figure 2:
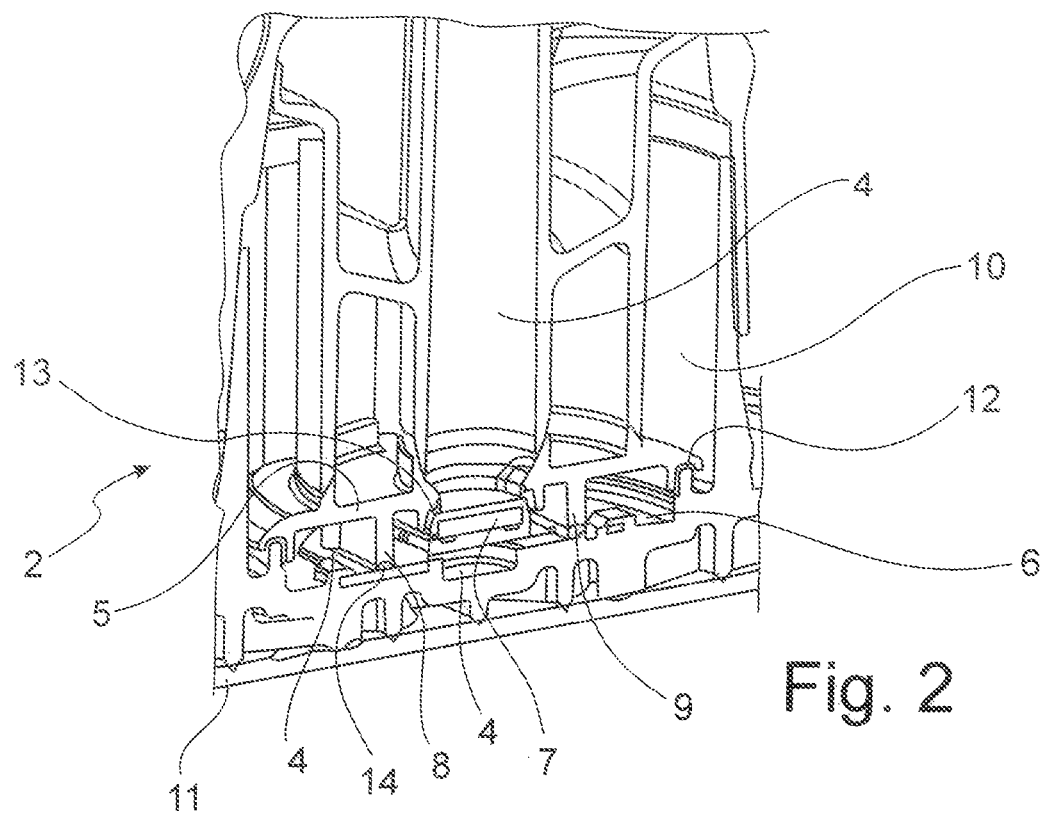
FIG. 2: a sectional view of the lower part of a device according to the invention.

FIG. 2 shows a cross-section through the lower part of damping cup 2, also showing the central measuring tube 4 and an antechamber 10. The bottom of device 1 is delimited by a flange 11, on which the floor 6 of electronics installation space 4 is arranged. The electronics installation space 4 situated above this is defined upwardly by cover 5. The encapsulation of electronics installation space 4 is assured by a peripheral bond, particularly a bonded joint 12, between cover 5 and floor 6. Cover 5 has a central cutaway 16 which corresponds to measuring tube 3 and in which the ultrasonic sensor 7 is arranged. In order to protect the encapsulation of electronics installation space 4, ultrasonic sensor 7 is fastened to cover 5 by means of a sealed, bonded joint 13. Generally, another type of connection would also be possible. At any rate, the connection must ensure that the encapsulation remains intact and electronics installation space 4 remains sealed. Support 8, 9 is provided inside electronics installation space 4, realised in this case as parallel struts arranged on both sides of measuring tube 3 and on both sides of ultrasonic sensor 7. The length of support 8, 9 in the x-direction or alternatively in the Y-direction is greater than the diameter of the measuring tube and/or greater than the edge length of ultrasonic sensor 7. Supports 8 and 9 are arranged symmetrically on both sides of measuring tube 3. In this example, supports 8 and 9 are constructed as a single part with cover 5 and connect the cover in force-fitting manner to the floor 6 of electronics installation space 4. A bonded joint 14 is provided for this purpose, with which the lower ends of supports 8 and 9 are joined to floor 6 of electronics installation space 4. The bottom termination of support 8, 9 is formed with a triangular recess in the profile, thus forming a triangular profile. This might also be described as a central, lengthwise recess or groove. It serves to enhance the effect of a force-fitting bonded joint 14.

Figure 3:
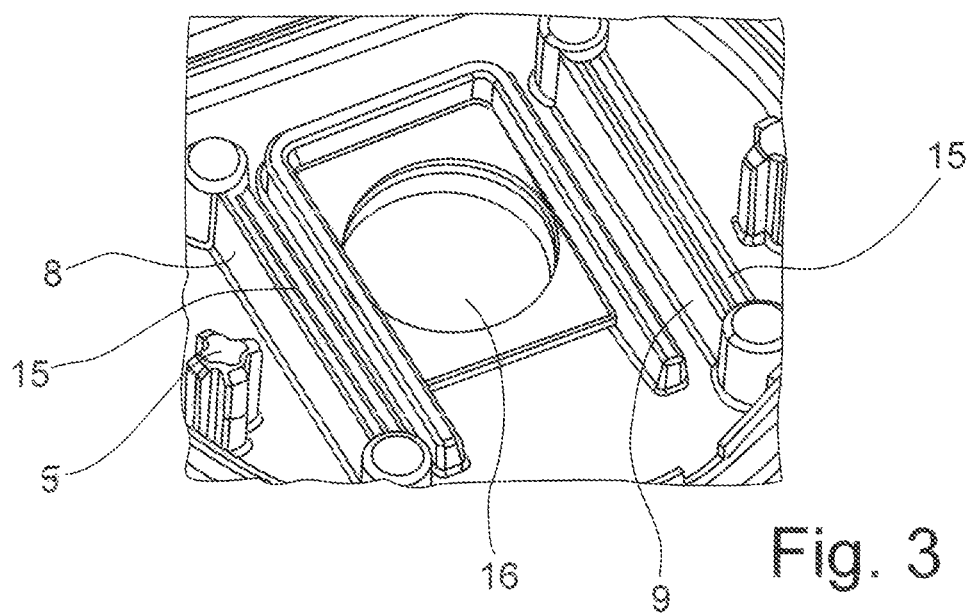
FIG. 3: a view of a part of the electronics installation space from below.

FIG. 3 is a perspective view of cover 5 from below. Only a portion thereof is represented here, particularly showing cutaway 16 in cover 5, to which ultrasonic sensor 7 is fastened from below. Cutaway 16 represents an extension of the adjoining measuring tube 3. Supports 8 and 9, in the form of struts, are arranged symmetrically on both sides of the cutaway, and are each longer than the diameter of cutaway 16 and/or of measuring tube 3. A triangular profile 15 is apparent at the foot of supports 8 and 9, visible here because of the view looking up from below, and serves to collect adhesive from the bonded joint 14 which must be made, thereby ensuring a particularly good force-fitting bond with floor 6.

Figure 4:
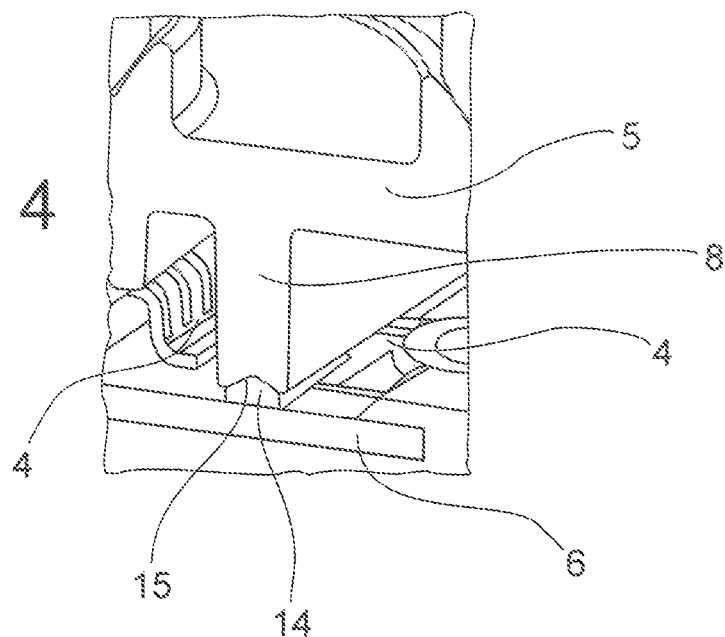
FIG. 4: an enlarged representation of a cross-section through a support.

FIG. 4 is an enlarged representation of a cross-section through a support 8, which is formed integrally on cover 5. Here too, the force-fitting connection with the floor 6 of electronics installation space 4 is shown particularly clearly, wherein the bottom end area of support 8 has a triangular profile 15, where the bonded joint 14 is made.

Figure 5:
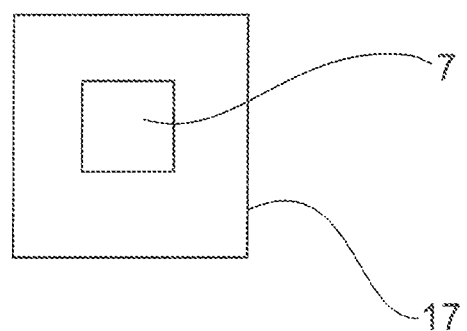
FIG. 5: another embodiment of the invention in a schematic representation.

FIG. 5 also shows entirely schematically a further embodiment of support 8, 9. In this case, not just two parallel supports or one support is/are present, but instead a closed geometrical structure 17 is formed. Ultrasonic sensor 7 is positioned inside this closed structure 17. Support 8, 9 thus forms a closed, box-like structure 17, surrounding ultrasonic sensor 7 and directing the vibration forces that act on the damping cup directly into the floor 6 of electronics installation space 4, thus relieving the external joints, particularly the bonded joints 12 between cover 5 and floor 6 of electronics installation space 4. Closed structure 17 may be constructed as a closed rectangle, a closed triangle, a closed circle, or even a closed rhombus.

All of the features described in the preceding description, as well as those in the claims, can be implemented in any order and combination with the features of the independent claim. The disclosure of the invention is thus not limited to the feature combinations that are described and/or claimed, but all feature combinations practicable within the scope of the invention are rather to be considered disclosed.

The invention claimed is:

1. A device for measuring a fill level of a liquid in a reservoir with an ultrasonic sensor, wherein the ultrasonic sensor is arranged at the bottom end of a damping cup with a measuring tube, wherein electronic components are assigned to the ultrasonic sensor, wherein the electronic components are encapsulated in sealing manner against the liquid that is to be measured between a floor of an electronics installation space and a cover arranged above the floor, so that the electronics installation space surrounded by a side wall forms an encapsulated area, and at least one support is provided inside the electronics installation space, connecting the cover in force-fitting manner with the floor of the electronics installation space, wherein the at least one support and the side wall are positioned apart.

2. The device according to claim 1, wherein the lengthwise extension of the at least one support is greater than the diameter of the measuring tube.

3. The device according to claim 1, wherein two parallel supports are provided.

4. The device according to claim 3, wherein the parallel supports are arranged symmetrically about the measuring tube.

5. The device according to claim 1, wherein the at least one support forms a closed geometrical structure.

6. The device according to claim 5, wherein the closed geometrical structure is arranged symmetrically about an axis of the measuring tube.

7. The device according to claim 5, wherein the closed geometrical structure forms a square.

8. The device according to claim 1, wherein the at least one support is made as a single part with the cover.

9. The device according to claim 1, wherein the at least one support is connected to the floor of the electronics installation space via a force-fitting bonded joint.

10. The device according to claim 9, wherein the at least one support has a triangular profile at the foot thereof.

11. The device according to claim 1, wherein the cover and the floor of the electronics installation space are connected in the edge area via a bonded joint.

12. An internal combustion engine, for a motor vehicle having an oil-lubricated engine, wherein the oil-lubricated engine is equipped with a device according to claim 1 for measuring the fill level of the engine oil.

* * * * *